Oct. 17, 1933.  C. T. BREWER  1,931,283
ACTINOMETER
Filed Jan. 29, 1932
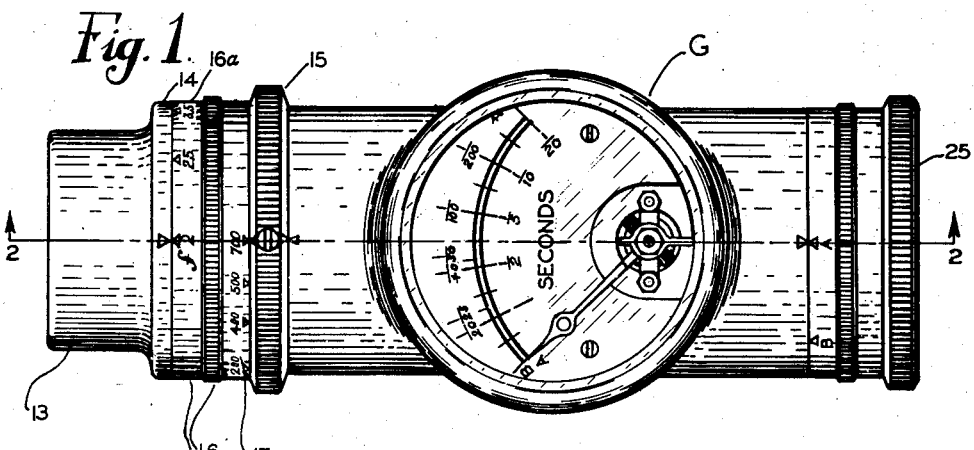
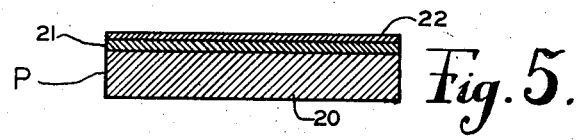
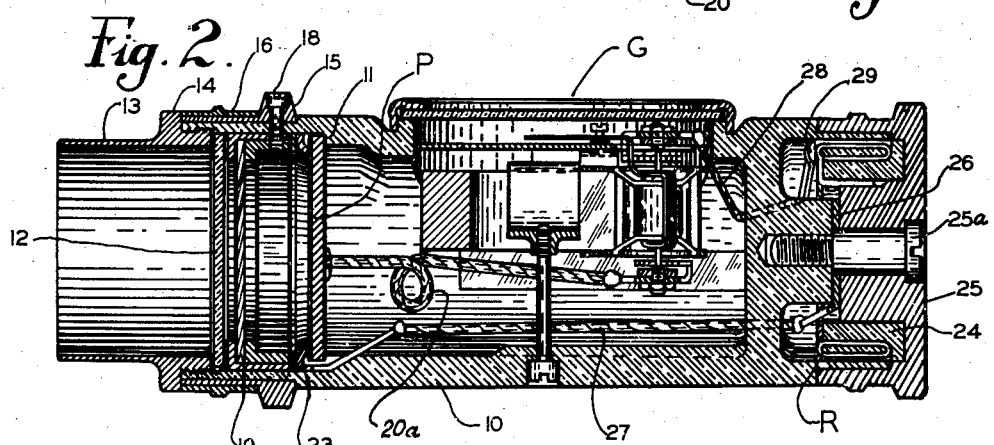
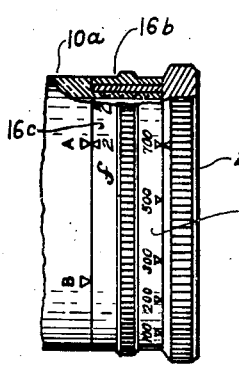
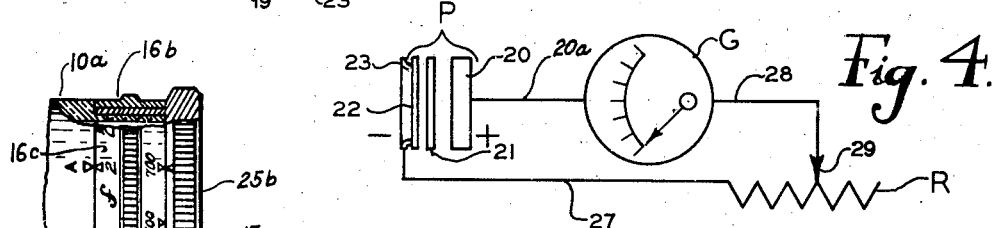
INVENTOR
CLARENCE T. BREWER
BY *Banning & Banning*
ATTORNEY Patented Oct. 17, 1933

1,931,283

UNITED STATES PATENT OFFICE 1,931,283

ACTINOMETER

Clarence T. Brewer, Chicago, Ill., assignor of one-third to Edward W. Menke and one-third to Harry E. Hillstrom, both of Chicago, Ill.

Application January 29, 1932. Serial No. 589,586

4 Claims. (Cl. 88—23)

An object of this invention is to provide an actinometer, or the like, to measure the intensity of the actinic light emanating from a given subject so that a photographer may be enabled to properly choose the stop opening and shutter timing of his camera to obtain the best results.

Another object is to provide such an actinometer as will read the timing of the shutter directly so that the operator will not be required to make additional calculations in order to obtain the desired shutter timing, or the stop opening, as the case may be. That is, he may assume a certain stop opening, and with this device read the shutter setting directly, or he may assume a certain shutter timing and read the stop opening directly.

Another object is to provide means in conjunction with the above for making the necessary correction for the light sensitiveness of the plate or film which is to be used.

Another object is to provide such a device which will have no parts which will deteriorate rapidly with time, or will need to be replaced over a long period of time if handled with ordinary care.

These and other objects, as will hereinafter appear, are accomplished by this invention which is fully described in the following specification and shown in the accompanying drawing, in which—

Figure 1 is a front elevation of an instrument embodying the invention;

Fig. 2 is a longitudinal section of the same taken on the line 2—2 of Fig. 1;

Fig. 3 is a partial section and elevation of the right-hand end of the device showing a modified form of the same;

Fig. 4 is a wiring diagram showing how the photoelectric cell is connected into the circuit so as to measure the intensity of light falling thereon; and Fig. 5 is a partial section of the photoelectric cell which is exposed to the light to be measured.

The embodiment illustrated shows an actinometer adapted to be held in the hand and to be directed toward the object or scene to be photographed so as to measure the intensity of the actinic light received therefrom. The actinometer as illustrated comprises a hollow body 10 having a shoulder 11 against which is held a photosensitive plate (or photoelectric cell) P which is shown enlarged in Fig. 5, and which will later be described in detail. A glass window 12 is secured some distance in front of the photoelectric plate P, and is held in place by means of a threaded barrel 13 screwed in the body, and which has a rim 14. If desired, a ray filter may be built into this structure, or the device may be adapted to receive such a filter. This barrel is proportioned to subtend the same angle as the lens of the cameras with which it is intended to be used.

A cylindrical sleeve 15 is mounted to rotate on the barrel 10, being held in place by the rim 14. A cylindrical member 16 is mounted to rotate on the sleeve 15 and carries a scale 17 which corresponds to the light sensitiveness of the plates or films for use in the camera. This scale is slidable in front of a marker on the sleeve 15, so that when the cylindrical member is adjusted on the sleeve for a particular film or plate it will thereafter rotate with it when the sleeve is turned.

The cylindrical member 16 carries a scale 16ᵃ which is graduated in terms of either of the usual systems of indicating camera stop openings, such as f. System which is commonly used on the better types of lens mountings. The cylindrical sleeve 15 is connected by means of a screw 18 to an iris diaphragm 19. The scale 16ᵃ shows the position of the iris diaphragm 19 and suitable stops (not shown) are provided to prevent the sleeve 15 being turned beyond the working limits of the diaphragm. Thus it will be seen that by rotating the sleeve, the iris diaphragm may be made to open or close so as to correspond to the stop openings of the lens, and that these stop openings may be indicated on the graduated scale 16ᵃ.

Referring now to Fig. 5, the photoelectric cell P illustrated comprises a disc 20 of metal, such as steel, aluminum, nickel, molybdenum, tungsten, copper, silver, etc., of sufficient thickness to be self-supporting. On one surface is deposited a very thin coating 21, of a suitable light sensitive material, such as selenium, molybdenite, argentite, and the like, when suitably prepared. Selenium is preferred, and this is deposited by sputtering, or by painting the disc with red crystalline selenium dissolved in carbon-disulphide. After either of these treatments it is placed in a vacuum furnace and annealed at a temperature of 150° C. to 210° C., depending on the wave length of light at which it is desired that the cell shall operate. By varying this temperature it can be made more sensitive to the red rays or more sensitive to the violet rays, the crystallization taking place at any temperature between the above limits, provided it is maintained at that temperature a sufficient length of time.

Over this coating of selenium is placed a very thin coating 22 of some metal which does not readily oxidize, such as platinum, gold, and the like. Platinum is preferably deposited by sputtering, painting, as platinum chloride, and the like. A cell so made develops a very weak electromotive force when the surface thus coated is exposed to a source of light, the voltage so developed being a function of the intensity of the received light. The above cell is old and forms no part of the present invention, but is described as illustrative of the type of cell which is required for the operation of this device. This cell is then connected up in series circuit, as indicated in Fig. 4, the iron plate 20 being connected through a lead 20$^a$ to one side of a galvanometer or microammeter G, the other side being connected through a variable resistance R with a metal ring 23 which bears upon the face of the coating 22, which forms the negative side of the cell. The galvanometer, as shown in Fig. 1, may be graduated in terms of the exposure which is expressed in fractions of a second. Thus for a given setting of the adjustable resistance R the galvanometer needle may indicate the length of the exposure for a given stop opening.

Referring now to Fig. 2, the resistance R is made up in the form of a coil and preferably mounted in a block of insulating material 24, which is secured in a knob 25 so as to be rotatable therewith about a screw 25$^a$. One end of this coil is connected through a plate 26 with the lead 27, which in turn is connected to the annular ring 23. The negative side of the galvanometer connects through a lead 28 with a brush 29 which is suitably mounted so as to be held stationary while the resistance coil R is rotated in front of it, the brush making contact with the coils of the resistance wire R. If desired, the coil may be stationary, and the brush rotatable. Thus by properly choosing the values of the resistance R to correspond to the other resistances of the circuit of Fig. 4, and by properly graduating the scale of the galvanometer, one such scale as A may represent the shutter setting or timing for a given stop opening as set on the scale 16$^a$. By turning the knob 25 so as to make the total resistances of the circuit a given multiple of that for the setting just described with corresponding settings of the scale 16$^a$, the galvanometer needle will indicate the timing on a second scale which we may call B.

If it is desired to reverse the process and to find the stop opening for a given shutter timing, the knob 25 is turned so that A lies in front of the indicator, after which the barrel is turned toward the objects to be photographed. The sleeve 15 is then turned until the galvanomer needle stands opposite the desired shutter opening in the scale A. When this is reached the scale 16$^a$ is then read, and the reading on this scale opposite the indicator is the corresponding stop opening. If the shutter speed desired lies on the scale B, the knob is first turned to bring the mark B in front of the indicator, after which the sleeve is turned until the needle stands opposite the desired timing on the scale B. The reading on the scale 16$^a$ is the stop opening sought for.

The term "intensity" as used in the specification and claims is intended to cover particularly the intensity of a selected actinic portion of the light measured corresponding to the light to which a given photographic plate or film is the voltage generated or strength of current flowing, or a combination of the two.

Fig. 3 shows a modification of the device in which the iris diaphragm 19 and its operating parts 15, 16, etc., are omitted and a full stop opening, say $f$. 2, is used. In this, the housing 10$^a$ is provided as before with a rotatable knob 25$^b$ which has the same resistance R as Fig. 2. It has a cylindrical member 16$^b$ rotatably mounted thereon which carries on one edge a scale 17$^a$ graduated to correspond to the light sensitiveness of the film and adapted to rotate in front of an indicator on the knob. This member has another scale 16$^c$ on the opposite edge which corresponds to stop openings of the diaphragm. This scale is movable with the knob in front of two indicators marked A and B (Fig. 3), which correspond to the two scales A, B of the galvanometer.

In operation, the scale 17$^a$ is first adjusted for film or plate speed, after which the knob 25$^b$ is turned to a desired stop opening on the scale 16$^c$, let us say on the indicator A. The position of the pointer is then read on the galvanometer scale A. If this needle runs off the scale to the right, the knob 25$^b$ is then turned to some other position where the needle is on the scale. If the scale 16$^c$ is then in front of both indicators A and B, then either $f$. stop opening so indicated may be used by taking the shutter speed from the corresponding scale of the galvanometer.

In the same way as pointed out before, the shutter speed may be assumed and the knob turned to bring the needle to this speed, after which the stop opening may be read on the corresponding A or B indicator on the scale 16$^c$. In this case the adjustment is made by the resistance R, the total amount of light from a given source falling on the photo-sensitive plate P remaining constant.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. An actinometer comprising a housing enclosing a photoelectric cell capable of generating an electrical energy which is a function of the intensity of light received from an object to be photographed, a diaphragm adjustable to correspond to various camera stop openings, a galvanometer in series circuit with the cell for measuring the strength of electrical energy generated, said galvanometer having a plurality of scales, a resistance in series circuit for varying the position of the galvanometer needle on said scale, each scale having a corresponding indicated position on the resistance, a member for adjusting said resistance, said member and body having co-operating means for indicating each position of the resistance corresponding to one of said scales, a sleeve rotatable on the housing and operably connected to the diaphragm, and a scale on the sleeve adapted to move in front of a pointer on the housing to indicate the diaphragm opening.

2. An actinometer comprising a housing enclosing a photoelectric cell capable of generating electrical energy which is a function of the intensity of light received from an object to be photographed, a diaphragm adjustable to correspond to various camera stop openings, a galvanometer in series circuit with the cell for measuring the strength of the electrical energy generated, said galvanometer having a scale graduated in terms of shutter timing, having means for correcting the readings of the galvanometer for the speed of the photographic film or plate to be used, a sleeve rotatable on the housing and operably connected to the diaphragm, and a cylindrical member rotatably mounted on the sleeve and having graduations corresponding to the speed of the film or plate used and having a scale cooperating with a pointer on the housing to indicate the diaphragm opening.

3. An actinometer comprising a cylindrical housing enclosing a photoelectric cell capable of generating electrical energy which is a function of the intensity of light received from an object to be photographed, a diaphragm adjustable by means of a sleeve rotatably mounted on the cylindrical housing to correspond to various camera stop openings, a galvanometer in series circuit with the cell for measuring the strength of the electrical energy generated, and a cylindrical slider rotatably mounted on the sleeve, said slider having a scale corresponding to the stop openings of the diaphragm rotatable in front of an indicator on the housing and having a scale corresponding to film speed movable in front of an indicator on the sleeve, said galvanometer having a dial located at the side of said housing, the axis of the dial being at right angles to that of the cylindrical housing.

4. An actinometer comprising a cylindrical housing enclosing a photoelectric cell capable of generating electrical energy which is a function of the intensity of light received from an object to be photographed, a diaphragm adjustable by means of a sleeve rotatably mounted on the cylindrical housing to correspond to various camera stop openings, a galvanometer in series circuit with the cell for measuring the strength of the electrical energy generated, a cylindrical slider rotatably mounted on the sleeve, said slider having a scale corresponding to the stop openings of the diaphragm rotatable in front of an indicator on the housing and having a scale corresponding to film speed movable in front of an indicator on the sleeve, an adjustable resistance in the circuit, and a member rotatably mounted on the housing and having means for varying the adjustable resistance, said galvanometer having a plurality of scales graduated in terms of shutter timing, said member having a plurality of indicia corresponding to said galvanometer scales and to settings of said resistance so that each indicia indicates one of said scales.

CLARENCE T. BREWER.